Sept. 11, 1962　　　C. KRAUTHAMER　　　3,053,108
MOTOR CONTROL DEVICE FOR INDUSTRIAL STITCHING MACHINES
Filed June 21, 1961

INVENTOR.
CHARLES KRAUTHAMER
BY
ATTORNEY

United States Patent Office 3,053,108
Patented Sept. 11, 1962

3,053,108
MOTOR CONTROL DEVICE FOR INDUSTRIAL STITCHING MACHINES
Charles Krauthamer, 2173 Coney Island Ave., Brooklyn, N.Y.
Filed June 21, 1961, Ser. No. 118,701
4 Claims. (Cl. 74—491)

This invention relates generally to motor-operated industrial stitching machines and more particularly to mechanism for starting the operation of the machine and for regulating the speed thereof.

Industrial stitching machines and other similar machines are ordinarily motor-operated with the drive from the motor to the machine being communicated by depressing a foot pedal to move a pulley into operative connection with a clutch assembly. The extent of the depression of the pedal controls the speed of the machine.

It is the principal object of the present invention, however, to provide a hand-operated mechanism for communicating the drive from the motor to the machine including a finger turnable dial.

Another object of the invention is to provide starting mechanism for machines of this type that is easily and quickly adjustable as to its effect on the clutch assembly.

A further object of the invention is to provide such a starting mechanism that is adapted to be mounted at selected places along the worktable on all makes of motor operated stitching machines and various other kinds of machines.

Still another object is to provide such a machine starting mechanism that is easily and quickly installed or removed.

It is also an object to provide such a machine starting mechanism that is simple in construction, economical to manufacture and durable in use and effective for the purposes intended.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
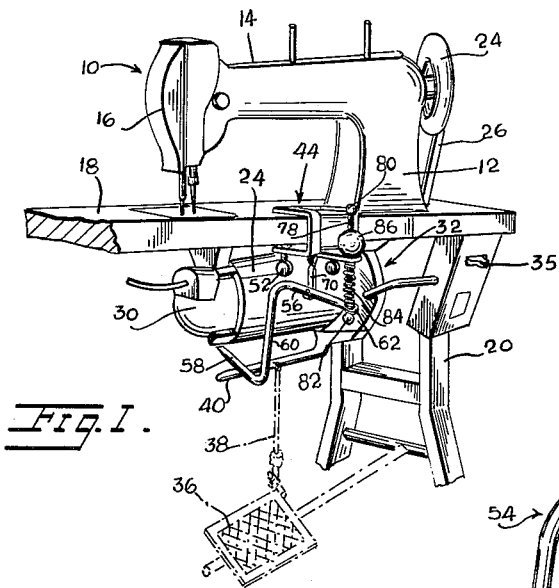
FIG. 1 is a perspective view of a stitching machine with machine starting mechanism embodying my invention applied thereo, with ordinary starting mechanism shown in dot-dash lines, parts being broken away.
Figure 5:
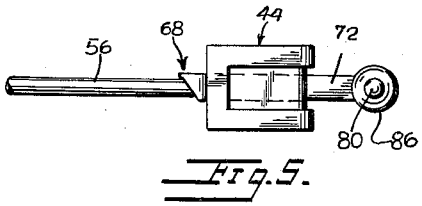
FIG. 5 is a top plan view thereof, parts being broken away.

Referring in detail to the drawings, in FIG. 1 a stitching machine 10 of conventional type is shown. The machine may be the heavy, light or medium type and has a hollow body consisting of a vertical standard 12 which supports an overhung arm 14 formed at its free end with a sewing head 16. The body of the machine rests upon a worktable 18 supported by a frame 20 on a floor 22. The machine is provided with the usual pulley 24 driven by a belt 26 entrained around another pulley 28. The pulley 28 is driven by an electric motor 30 supported underneath the worktable and conventional clutch assembly indicated generally at 32 connected to the motor drive shaft. The pulley 28 with its hub 34 is adapted to be slid into operative connection with the clutch assembly whereby the pulley is rotated. The clutch assembly provides a variety of speeds for turning the belt and driving the machine 10. The motor is supplied with current from the house supply controlled by a switch 35.

Figure 2:
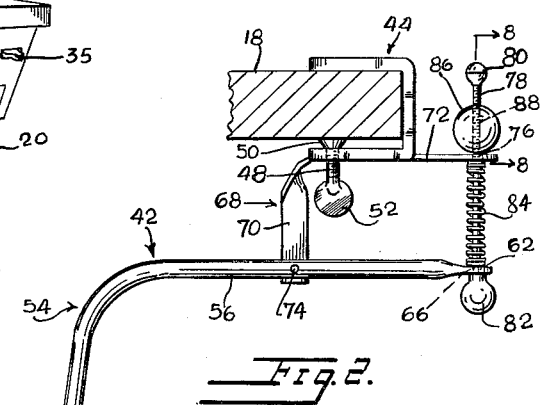
FIG. 2 is a side elevational view of the machine starting mechanism, per se, on an enlarged scale.
Figure 7:
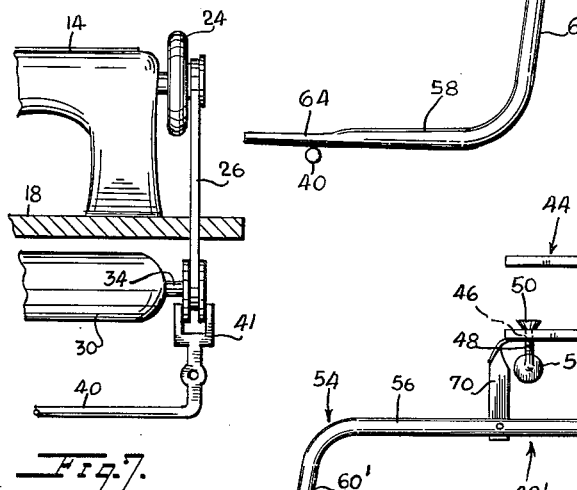
FIG. 7 is a part elevational and part diagrammatic view showing the right-hand end of the machine, parts being omitted.
Figures 3, 4:
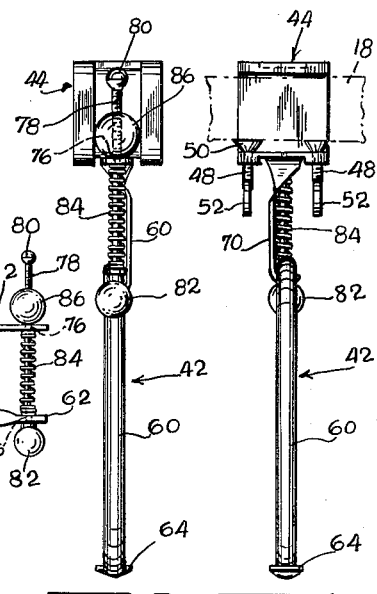
FIG. 3 is an end view looking from the right-hand side of FIG. 2.
FIG. 4 is a similar view looking from the left-hand side of FIG. 2.

Heretofore, a depressible foot pedal 36 with linkage 38 shown in dotted lines in FIG. 1 was used for moving a pivoted bar 40 with yoke 41 for sliding the pulley 28 into operative connection with the clutch assembly and motor for starting the operation of the machine. In accordance with the present invention, however, hand-actuated mechanism shown in detail in FIG. 2 and generally indicated at 42 is used for this purpose in place of the pedal and linkage. This mechanism 42 is removably fixed to the worktable 18, opposite the free end of the pivoted rod 40, by means of a U-shaped bracket 44. One leg of the bracket, the leg under the worktable, as shown in FIGS. 1 and 2, is formed with central threaded openings 46 at its free end and extending through each of said openings there is a threaded clamping bolt 48 having a conical-shaped head 50 at one end engaging the undersurface of the worktable, the other end of the bolt having an actuating finger piece 52.

The machine starting mechanism 42 consists of an elongated angular round bar 54 having two parallel portions 56 and 58 connected by a portion 60 disposed at right angles thereto. The end of portion 56 is flattened as indicated at 62 and the end of portion 58 is flattened as indicated at 64, end 64 being longer than end 62. The flattened end 62 is formed with a hole 66. The portion 56 of the bar is pivotally connected to an angular flat strap of sheet metal 68 twisted midway its ends in a half turn to provide a vertical portion 70 and a horizontal portion 72 offset from the plane of the portion 70 as viewed in FIG. 2.

A pivot pin 74 extending through aligned holes in the portion 56 of bar 54 and the portion 70 of the strap 68 pivotally mounts the bar 54. The horizontal portion 72 of the strap 68 is secured to the bottom leg of bracket 44 by welding or the like, said portion extending beyond the bracket 44 and being formed with a hole 76 at its end. An elongated threaded rod 78 extends through the aligned holes 66 and 76 and is formed with a spherical head 80 at one end above the portion 72 and with a larger spherical head 82 at the other end below the flattened end 62 of rod 54. A compression spring 84 is sleeved around the threaded rod 78 with one end seated on the flattened portion 62 and its other end impinging against the end of portion 72 of strap 68. A dial or ball 86 having a central threaded opening 88 is threaded on the threaded rod 78 above the end portion 72 of strap 68.

In order to install the machine starting mechanism 42, it is merely necessary to place the bracket 44 on the edge of the platform opposite the free end of pivoted rod 40 with the flattened end 64 of the portion 58 of rod 54 over and contacting the pivoted rod 40 connected to the pulley 28 and motor clutch mechanism. The motor 30 is started by closing the switch 35. Thereafter, by merely turning the dial or ball 86 on the threaded rod 78 in the proper direction, the rod will be raised against the action of spring 84 thereby lifting up the end 62 of the rod 54 and pressing down the end 64 thereof against the pivoted rod 40 whereby the pulley 28 is shifted into connection with the clutch assembly thereby starting the machine. The higher the threaded rod 78 is moved upwardly, the greater the tilt downwardly of the rod 54 and the higher the speed of the machine which is controlled by the clutch assembly in the ordinary manner. In order to stop the machine, the dial 86 is turned in the opposite direction.

Figures 6, 8:
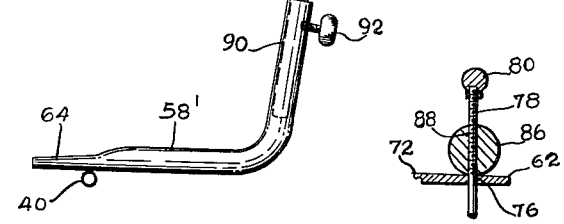
FIG. 6 is a view similar to FIG. 2 of machine starting mechanism embodying a modified form of the invention.
FIG. 8 is an enlarged sectional view taken on the line 8—8 of FIG. 2.

In FIG. 6, a modified form of machine starting mechanism 42' is shown. This form differs from the mechanism 42 in that the portion 58' of rod 54' is separate from the portion 60' and is formed with a socketed end 90 to receive the end portion 60'. A setscrew 92 clamps the portion 60' in place in the socketed end. This affords an adjustment of the length of the rod 60' when necessary.

In all other respects, the mechanism 42' is similar to the mechanism 42 and similar reference numerals are used to indicate similar parts.

It will thus be seen that by a slight manual turn of the dial or ball 86 by the fingers of the operator in the proper direction, the machine 10 can be set into operation, and if greater speed is desired it is merely necessary to turn the dial farther as desired.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A hand-operated device for moving a machine starting bar comprising a bracket adapted to be removably mounted on a worktable, an elongated angular bar tiltably mounted on the bracket at right angles to the plane of the starting bar, said angular bar having an opening at one end beyond its pivot point, an extension on the bracket disposed over the perforated end of the angular bar, said extension having an opening in line with the opening in the end of the angular bar, a threaded rod extending loosely through said aligned openings and protruding outwardly thereof, spheres on the outer protruding extreme ends of the threaded rod to prevent movement through the openings, a compression spring sleeved around the threaded rod between the perforated end of the angular bar and the extension, and a spherical dial having a central threaded bore rotatably mounted on the threaded rod outwardly of the extension whereby upon rotation of the dial in one direction the threaded rod moves through the opening in the extension carrying the sphere at one end of the threaded rod therealong and thereby moving the perforated end of the angular bar upwardly against the action of the spring, tilting the same and moving the other free end of the angular bar downwardly against the free end of the starting bar thereby actuating said bar.

2. Operating mechanism for a pivoted rod for operatively connecting a machine to a motor, said mechanism including a bracket for clamping the mechanism to a flat horizontal support, an angular strap secured to said bracket, said strap having a horizontal portion extending outwardly of the bracket and a vertical portion, said horizontal portion having a hole at its outer end, an angular rod having two parallel portions connected by a portion at right angles thereto, one of said parallel portions pivotally connected to the vertical portion of the strap, said one parallel portion disposed spaced from and parallel to said horizontal portion of the strap, said one parallel portion having a hole in its end in alignment with the hole in the strap, a threaded rod extending through said aligned holes and outwardly thereof, a compression spring sleeved around the threaded rod between the horizontal portion of the strap and said one parallel portion of the angular rod, means on the ends of the threaded rod to limit longitudinal movement thereof, and a ball with a central threaded opening threaded on said threaded rod outwardly of said horizontal portion of the strap whereby rotation of the ball causes the threaded rod to move longitudinally and causes the angular pivoted rod to tilt on the strap.

3. A device for moving a machine starting bar, including an angular rod having parallel end portions and an intermediate portion at right angles to the end portions joining said end portions, the extremities of said end portions being flattened, an angular strap member pivotally connected at one end to one of said parallel end portions, the other end of the strap member being disposed parallel to and spaced from said one parallel end portion, said one parallel end portion and said other end of the strap member having aligned holes therein, a threaded rod extending through said aligned holes and protruding outwardly thereof, a compression spring sleeved around the portion of the threaded rod between said one parallel end portion and said other end of the strap member, means for moving said threaded rod longitudinally and means for limiting the longitudinal movement of said threaded rod, and means for detachably mounting said strap on a flat supporting surface, said means for moving said threaded rod longitudinally comprising a ball having a centrally threaded opening threaded onto said threaded rod outwardly of said strap, said means for limiting the longitudinal movement of said threaded rod comprising a spherical member at each end of said threaded rod outwardly of said strap and of said angular pivoted rod, and said means for detachably mounting said strap on a flat supporting surface comprising a U-shaped horizontally disposed bracket having one leg secured to the horizontal portion of said strap.

4. A device for moving a machine starting bar as defined in claim 3, wherein one end of the angular rod is separate from its intermediate angular portion and connected by a socket joint with a setscrew for holding the said one end and said intermediate angular portion against relative movement.

References Cited in the file of this patent
UNITED STATES PATENTS

| 2,546,393 | Hale | Mar. 27, 1951 |
| 2,739,552 | Sailer | Mar. 27, 1956 |
| 2,917,142 | Thorner | Dec. 15, 1959 |
| 2,921,547 | Artzt | Jan. 19, 1960 |
| 2,960,885 | Donaldson | Nov. 22, 1960 |

FOREIGN PATENTS

| 217,744 | Switzerland | Feb. 16, 1942 |